Patented Sept. 2, 1930

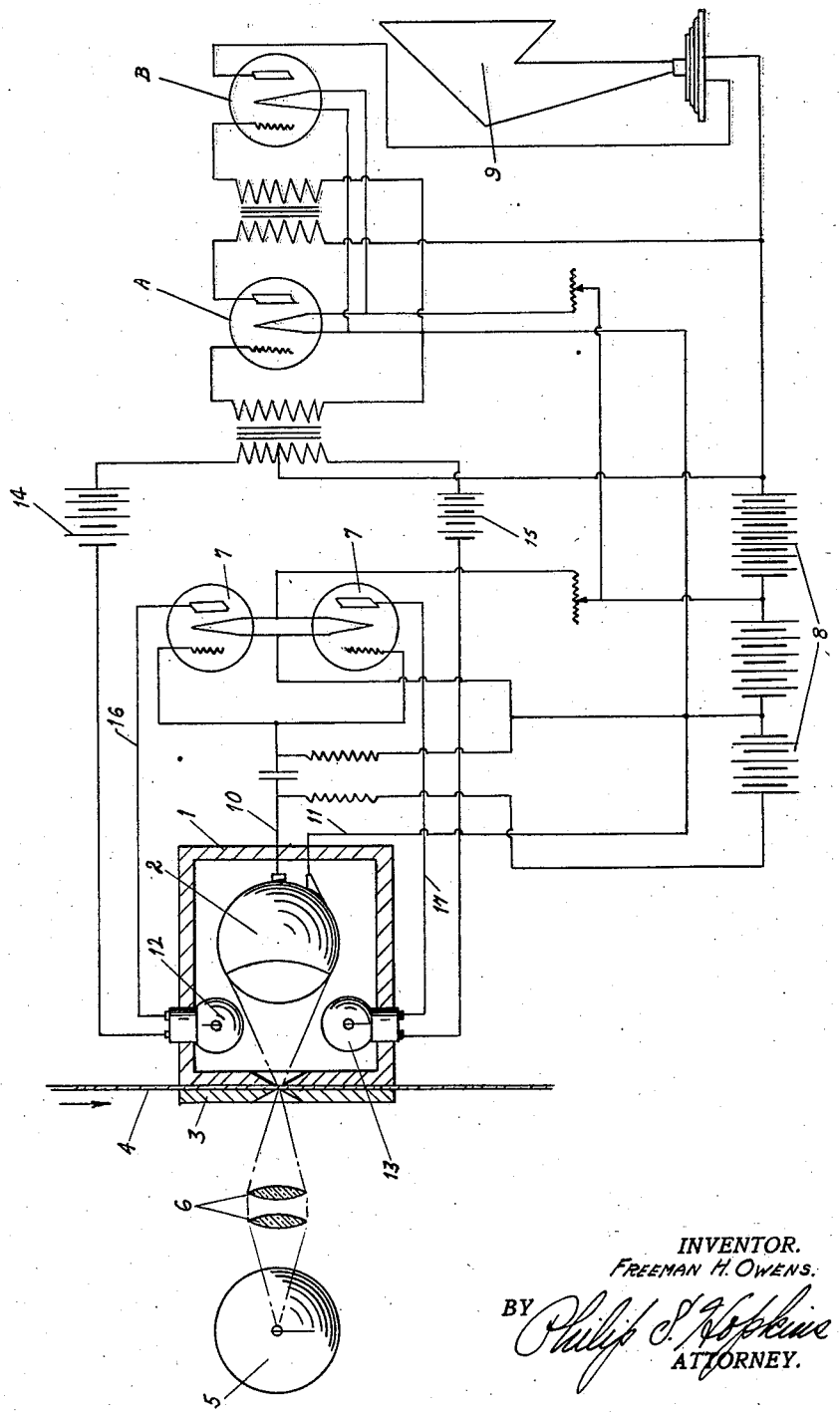

1,774,759

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

PHOTOGRAPHIC SOUND-REPRODUCING APPARATUS

Application filed May 28, 1929. Serial No. 366,644.

This invention relates to improvements in photographic sound reproducing apparatus, the principal object of the invention being to provide improved means for increasing the output of the light sensitive element usually employed in such apparatus.

Other objects and advantages of the invention will appear as the description proceeds.

The accompanying drawing illustrates diagrammatically an apparatus embodying the features of the present invention, the housing for the light sensitive element being shown in section.

Referring to the drawing, 1 designates a housing within which is disposed a light sensitive element such for instance as a photo electric cell 2, which housing is provided at one end with a gate 3 of the usual form for supporting a traveling film 4 and having a slit through which light from a lamp 5 may be focused by a lens 6 upon a photographic sound record carried by the film whereby the light rays are modulated before being received by the photo electric cell.

For purposes of illustration a push pull amplifier is shown herein comprising the usual tubes 7, source of current 8 and the other accessories common in this type of apparatus and further description of which is deemed unnecessary herein. The amplifier may of course have as many stages of audio amplification as desired before the output is connected to a loud speaker 9, two such stages being herein shown, designated respectively A and B. The output of the photo electric cell 2 is connected by wires 10 and 11 to the amplifier.

Within the housing 1 are mounted a pair of lamps 12 and 13 in position to activate the photo electric cell and which are supplied with current from a suitable source, such for instance as batteries 14 and 15 respectively. The lamps 12 and 13 are connected by wires 16 and 17 respectively in the plate circuits of the tubes of the push-pull amplifier, whereby a portion of the plate current of said tubes is impressed upon the lamps 12 and 13 thereby varying the intensity of said lamps with the plate current. It will thus be obvious that the light from the lamps 12 and 13 will be modulated exactly in accordance with the variations of the plate current. This invention, therefore, provides a feed back circuit for a sound reproducing apparatus by means of which the output of the photo electric cell is greatly increased.

It will be understood, of course, that I do not limit my invention to the use of a push-pull amplifier, since it is obvious that a single detector tube may be used and a portion of the plate current of such tube fed back to a single lamp.

I claim:

A sound reproducing apparatus, comprising in combination, a light source, means for supporting a traveling photographic sound record, means for focusing light from said source through said sound record, a photo electric cell in position to receive the modulated light rays after their passage through the sound record, a push-pull amplifier connected with the output of said light sensitive element, a pair of lamps in position to activate said photo electric cell, and feed back circuits between the respective lamps and the plate of one of the amplifier tubes thereby to vary the intensity of said lamps in accordance with the plate current of the amplifier.

In testimony whereof, I affix my signature.

FREEMAN H. OWENS.